United States Patent [19]

Nelson et al.

[11] Patent Number: 4,971,641
[45] Date of Patent: Nov. 20, 1990

[54] METHOD OF MAKING COUNTERROTATING AIRCRAFT PROPELLER BLADES

[75] Inventors: Joey L. Nelson, Cincinnati, Ohio; Sidney B. Elston, III, Marblehead, Mass.; Wu-Yang Tseng, West Chester; Martin C. Hemsworth, Cincinnati, both of Ohio

[73] Assignee: General Electric Company, Cincinnati, Ohio

[21] Appl. No.: 490,506

[22] Filed: Mar. 1, 1990

Related U.S. Application Data

[63] Continuation of Ser. No. 270,565, Nov. 14, 1988, abandoned.

[51] Int. Cl.$^5$ .................. B32B 31/12; B32B 31/14
[52] U.S. Cl. ........................... 156/064; 73/455; 73/458; 73/468; 156/91; 156/245; 244/123; 416/144; 416/226; 416/233
[58] Field of Search .................. 73/455, 458, 468; 156/64, 91, 245; 244/123; 416/144, 226, 230, 233

[56] References Cited

U.S. PATENT DOCUMENTS

| 2,312,219 | 2/1943 | Sensenich | 170/159 |
|---|---|---|---|
| 2,541,661 | 2/1951 | Palmatier et al. | 244/134 |
| 3,085,631 | 4/1963 | Dagrell | 170/159 |
| 3,103,977 | 9/1963 | Negroni | 170/159 |
| 3,664,764 | 5/1972 | Davies et al. | 416/224 |
| 3,883,267 | 5/1975 | Baudier et al. | 416/230 |
| 4,358,246 | 11/1982 | Hanson et al. | 416/223 R |
| 4,370,097 | 1/1983 | Hanson et al. | 416/228 |
| 4,407,635 | 10/1983 | Grimes et al. | 416/230 |
| 4,784,575 | 11/1988 | Nelson et al. | 416/226 |

FOREIGN PATENT DOCUMENTS

| 1036064 | 8/1958 | Fed. Rep. of Germany . |
| 81/00243 | 2/1981 | PCT Int'l Appl. . |
| 216177 | 6/1969 | U.S.S.R. . |
| 662110 | 11/1951 | United Kingdom . |
| 831380 | 3/1960 | United Kingdom . |
| 1083175 | 9/1967 | United Kingdom . |
| 1276356 | 6/1972 | United Kingdom . |
| 1330565 | 9/1973 | United Kingdom . |
| 1364006 | 8/1974 | United Kingdom . |
| 1433519 | 4/1976 | United Kingdom . |
| 2170868A | 8/1986 | United Kingdom . |

Primary Examiner—Robert A. Dawson
Attorney, Agent, or Firm—Jerome C. Squillaro

[57] ABSTRACT

An aircraft propeller blade is constructed by forming two shells of composite material laminates and bonding the two shells to a metallic spar with foam filler pieces interposed between the shells at desired locations. The blade is then balanced radially and chordwise.

22 Claims, 5 Drawing Sheets

METHOD OF MAKING COUNTERROTATING AIRCRAFT PROPELLER BLADES

The invention herein described was made in the performance of work under a NASA contract and is subject to the provisions of Section 305 of the National Aeronautics and Space Act of 1958, Public Law 85-568 (72 Stat. 435; 42 USC 2457).

This is a continuation of application Ser. No. 07/270,565, filed Nov. 14, 1988 and now abandoned.

FIELD OF THE INVENTION

This invention relates to aircraft propulsion systems and, more specifically, to a method of constructing, highly swept, wide chord, very thin propeller blades primarily from composite materials.

BACKGROUND OF THE INVENTION

The basic aircraft propeller has in the past been made of structural materials that have fallen short of their expected potential because of an increase in only one of the important structural efficiency parameters such as strength or stiffness. These materials have included steel, wood, aluminum, titanium, and the like. Because of these deficiencies, the aircraft industry has taken an intense interest in advanced fibrous reinforced composites. Proper use of these materials offers greater strength while reducing the weight structure of a blade by as much as fifty percent.

The aircraft blade contemplated in this invention is included in a counterrotating propeller system having a fore propeller with five to fifteen blades and a counterrotating aft propeller with from five to fifteen blades. The blades are highly swept, wide chord and very thin. The airfoils of the propeller blades operate at transonic and supersonic speeds.

Previous propeller blade designs were adequate for subsonic flight. However, numerous structural problems causing decreased performance resulted when these blades were used at high subsonic flight. The structural problems for a blade operating at a very high speed resulted from the forces and stresses acting on the blade. The forces acting on a blade in flight are thrust, centrifugal force, and torsion forces. First, the thrust induces bending stress in the blade. Second, the centrifugal force stretches the blade in the radial direction. Finally, the torsion forces the blade to twist about the radial axis of the blade. The ideal blade overcomes these forces while minimizing weight for efficient fuel consumption.

A solution to the blade problem has been the development of fiber reinforced resin-bonded structural composite materials. These materials have created a new design flexibility for propellers. There are three major advantages to the application of fiber reinforced composites. First, complex airfoil configurations can be shaped. Second, composite materials create weight savings. Third, the dynamic frequency response of the blade element can be tailored to its operating parameters. This invention overcomes the problems and disadvantages of the prior art blades by providing a propeller blade comprised of composite materials having the strength and airfoil configuration to provide an efficient blade for a counterrotating propeller system.

SUMMARY OF THE INVENTION

It is an object of the present invention to provide an efficient propeller blade comprised of unidirectional layers of fiber reinforced resin-bonded structural composite materials.

It is an object of the present invention to provide a counterrotating aircraft propeller blade which overcomes the forces and stresses which blades are subjected to at high speeds.

It is another object of the present invention to provide a counterrotating aircraft propeller blade which improves the efficiency of a counterrotating propeller system.

It is yet another object of the present invention to provide a blade that is radially and chordwise balanced for reduced system vibration and blade root bending loads.

In general, the aircraft propeller blade comprises a plurality of angle plied composite laminates forming a first and second shell having surfaces intersecting in a leading edge, a trailing edge, a root section and a tip end. The leading edge and trailing edge are swept back for reducing noise generated at the tip end and for reducing aerodynamic losses due to compressibility effects of air. A metallic spar is interposed between the first and second shells and bonded to the surfaces for stiffening the surfaces. Cavities are interposed between the surfaces for decreasing the weight of the blade. Positionally adjustable counterweights in the blade spar, fore and aft of the spar, balance the blade in a radial and chordwise direction.

The blade is constructed by providing a pattern of the blade having an area of constant thickness for the cross section of the blade for each shell surface. The composite material is shaped to the profile of the pattern. The first shell is formed by superimposing a plurality of composite layers of shaped material. The composite material includes unidirectional fibers encased in a low modulus matrix. The fibers in the respective layers are aligned in varying direction to provide strength and stiffness to the blade. The second shell is formed in a like manner. The blade spar is aligned between the first and second shells. Then foam filler pieces are positioned at predetermined locations for foam filled cavities between the shells. Adhesive is applied to the blade spar, inside surface of the shells and foam fillers. The adhesive, blade spar, shells and foam fillers are then bonded together by curing in an autoclave under the appropriate cure cycle for the low modulus matrix. Fasteners are then inserted through the composite blade for clamping the shells, spar, and foam fillers together. The blade is then balanced radially and chordwise for minimizing system vibration and blade root bending loads.

BRIEF DESCRIPTION OF THE DRAWINGS

Other objects and advantages inherent in this invention will become readily apparent hereinbelow in connection with the following disclosure, taken with the accompanying drawings, in which.

DETAILED DESCRIPTION OF A PREFERRED EMBODIMENT

Figure 1:
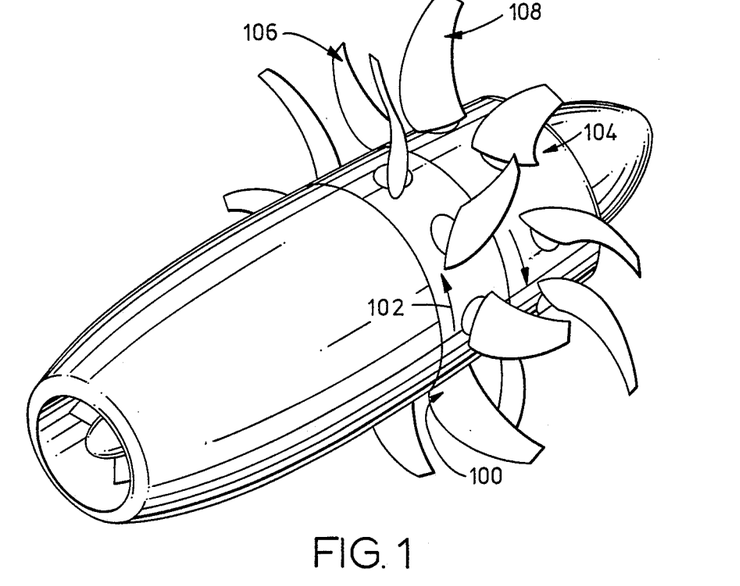
FIG. 1 illustrates a counterrotating propeller system using the blades of the present invention.

FIG. 1 illustrates a counterrotating propeller system of the present invention. In general, a first propeller 100 includes fore blade 106 rotating in direction 102 while an aft propeller 104 includes aft blade 108 rotating in an opposite direction. All blades on fore propeller 100 are identical, and all blades on aft propeller 104 are identical. The fore blades and aft blades differ from each other in dimensions. The structure of a typical fore blade and aft blade are described in U.S. patent application Ser. No. 157,179, filed Feb. 12, 1988, and entitled "Counterrotating Aircraft Propeller Blades," now U.S. Pat. No. 4,784,575 issued Nov. 15, 1988 which is a continuation of patent application Ser. No. 932,427, filed Nov. 19, 1986, now abandoned, the disclosure of which is hereby incorporated by reference.

Figure 2:
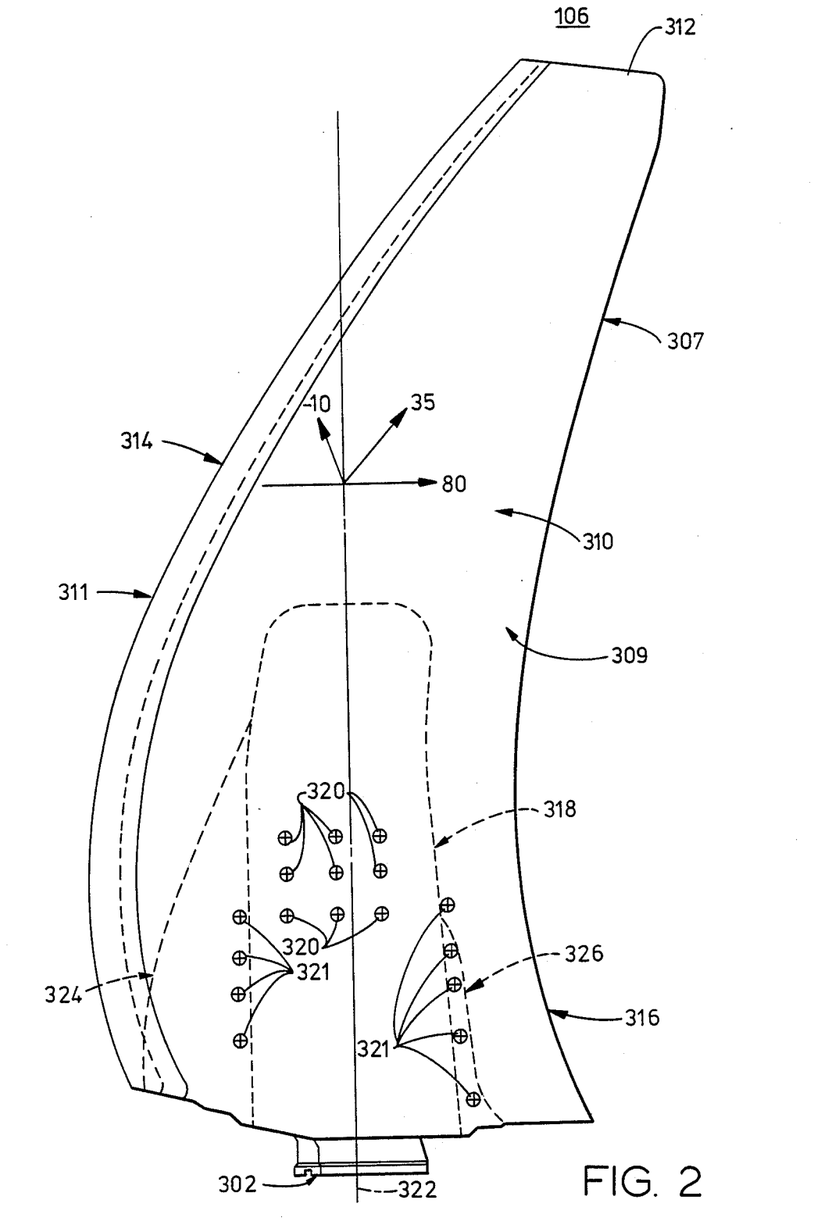
FIG. 2 shows an airfoil section of the fore blade including the blade spar and fasteners.

Referring to FIG. 2, the fore blade 106 has an airfoil section 310 including a tip end 312 and a root end section 302. The airfoil section 310 includes a leading surface 309 and a trailing surface 307 (hidden) between the tip end 312 and root section 302, comprised of a plurality of angle plied composite laminates of continuous fibers being embedded in a matrix material. The leading surface 309 and trailing surface 307 intersect in a convex-shaped leading edge 314 and a concave-shaped trailing edge 316 forming a swept back blade having a radial axis 322 as shown in FIG. 2. The leading surface 309 is convex while the trailing surface is concave. Two shells form the surfaces in which a metallic blade spar 318 is interposed between the leading surface 309 and trailing surface 307 and bonded to the shells for connecting the surfaces to the root section 302. A fore foam filled cavity 324 is positioned adjacent the leading edge of the spar 318. An aft foam filled cavity 326 is positioned adjacent the trailing edge of the spar 318. A leading edge sheath 311 is attached to the leading edge of blade 106 to protect it from erosion. A plurality of fasteners 320 are inserted through the surfaces, shells and blade spar to restrain the blade from separating under heavy load. Some of the fasteners are inserted positionally adjacent the leading edge and trailing edge of the blade spar to clamp the surfaces to the blade spar.

Figure 3:
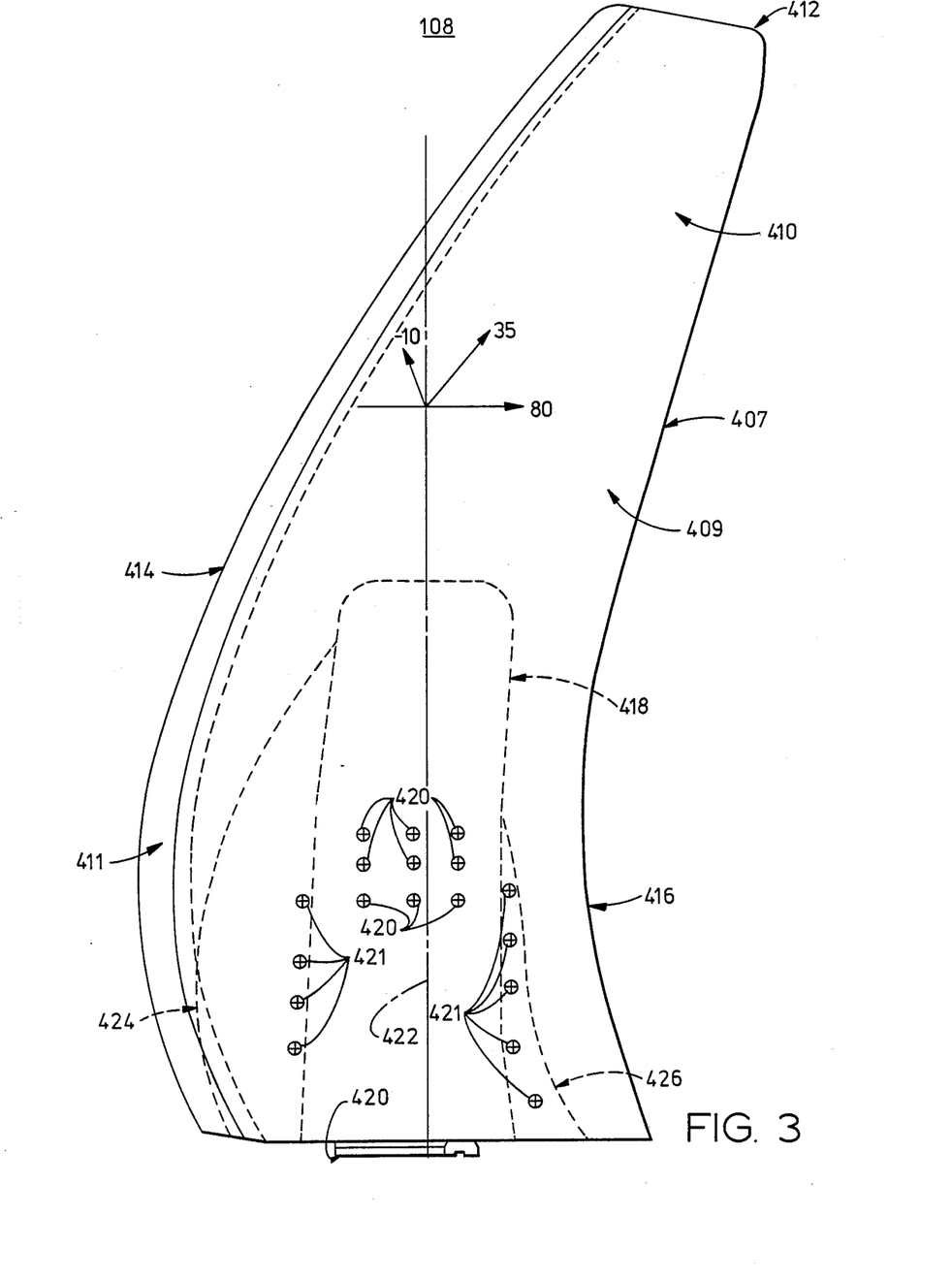
FIG. 3 illustrates the components of the aft blade including the leading and trailing surfaces, the leading and trailing edges, the tip end, the root section, and the blade spar.

Referring to FIG. 3, there is illustrated the structure of an aft blade. In general, aft blade 108 is similar in shape to fore blade 106. Aft blade 108 has an airfoil section 410 including a tip end 412 and a root section 402. The airfoil section 410 includes a leading surface 409 and a trailing surface 407 (hidden) between the tip end 412 and root section 402, comprised of a plurality of angle plied composite laminates of continuous fibers which are embedded in a matrix material. The continuous fibers of the composite laminate extend across the entire airfoil. The leading surface 409 and trailing surface 407 intersect in a convex-shaped leading edge 414 and concave trailing edge 416 forming a swept back blade having a radial axis 422, as shown in FIG. 3. The leading surface 409 is convex while the trailing surface 407 is concave. The surfaces form a shell composite in which a metallic blade spar 418 is interposed between the leading surface 409 and trailing surface 407 and bonded to the shells with a structural adhesive material, such as AF 3109-2K, manufactured by the 3M Corporation. It is noted that the adhesive is used to bond the fore blade as well as the aft blade. A foam filled cavity 424 is positioned adjacent the leading edge of spar 418. An aft foam filled cavity 426 is positioned adjacent the trailing edge of the spar 418. A leading edge sheath is fastened to the leading edge 411 for protection. A plurality of fasteners 420 are inserted through the shells and the spar to restrain the blade from separating. A second plurality of fasteners are inserted adjacent the blade spar through the shells to clamp the shells to the blade spar.

Each fore and aft blade is comprised of layers of unidirectional fibers. The fibers are unidirectional, side-by-side parallel encased in a ductile, low strength, low modulus matrix material which transfers load from fiber to fiber through shear and localizes the effect of a single fiber failure by redistributing the load near failed fiber ends to adjacent fibers. Typical fibers used in the practice of this invention are a composite of 80% graphite and 20% S-glass. However, numerous combinations of fibers, including, for example, Kevlar® fiber, boron fiber, and fiberglass, can be used.

While the present invention is described hereafter with particular reference to a fore blade, it is to be understood at the outset of the description which follow, it is contemplated that the apparatus and methods in accordance with the present invention apPly to the aft blade as well. Further, more than one fiber can be used in each layer or combination of layers.

The laminate is layered with the fibers of each layer being aligned in an alternating pattern of +80, +35, −10 and +35 degrees from the radial axis 322. It is to be understood that two consecutive layers may be layered at the same angle; however, when a layer angle is changed, the above sequence is followed. As is evident to one of ordinary skill, the sequence of angles can be changed for effecting a composite laminate with desired strength properties in various directions on the blade.

Figure 4:
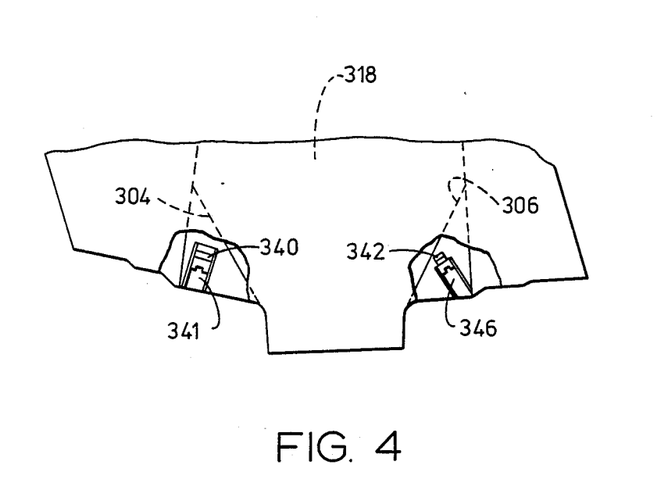
FIG. 4 is a diagram of the blade spar showing the fore and aft undercut cavities and the balancing weights.

The blade layup produces an aeroelastically stable blade with well tuned vibrational modes. Referring to FIG. 4, each blade includes a central blade spar 318 constructed of a high strength metal such as titanium. The metallic blade spar 318 is interposed between the leading and trailing surface and attached to each with an appropriate adhesive and bonded to each surface. The adhesive provides additional bonding strength to restrain the blade from separating. The blade spar 318 also provides stiffening and load transmission from the airfoil section to the root section, including a dovetail (not shown). The dovetail locks the spar into a rotating hub as is well known in the art.

One of the many functions of the spar 318 is to provide a connection between the blade and the rotating hub. The spar has hollow undercut cavities as outlined by phantom lines 304 and 306. The undercut cavities are adapted to include weighted members for statically balancing the blade about the radial axis 322 and chordwise axis. Fore spar undercut cavity 304 includes a balancing weight 340 constrained to move in groove 341. The balancing weight 340 includes a component of movement in a chordwise direction and a radial direction because of the angle groove 341 makes with the radial axis and chord. Additionally, an aft balancing weight 342 in groove 346 has a component of movement in a chordwise direction and a radial direction.

The fore balancing weight 340 and aft balancing weight 342 are positioned inside fore undercut cavity 304 and aft undercut cavity 306, respectively. The balancing weights move inside the grooves for effecting a radial balancing and a chordwise balancing in the blade. Movement may be effected in the grooves by threading the weights. However, other methods for moving the weights may be employed which are well known to those of ordinary skill in the art. Additional weights may also be added for effecting a greater mass change in the blade. The weights essentially change the center of mass or centroid of the blade.

Figure 5:
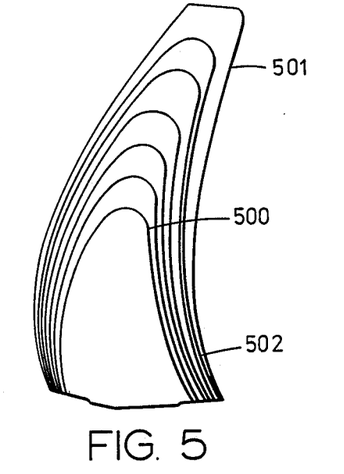
FIG. 5 illustrates the blade pattern having an area of constant thickness for the cross section of the first shell.
Figure 6:
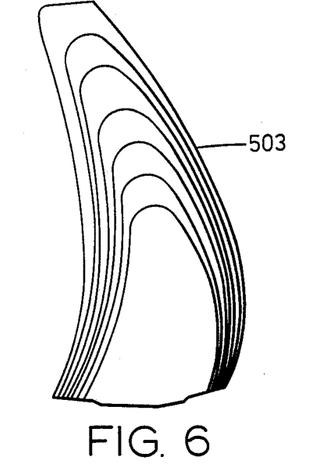
FIG. 6 shows the blade pattern having an area of constant thickness for the cross section of the second shell.

In constructing the blade, a pattern of both the concave 501 and convex side 503 of the blade are prepared, as shown in FIGS. 5 and 6. Fibers that are unidirectional, side-by-side parallel encased in a ductile low strength, low modulus matrix material are laid over a single layer of the pattern and cut to the layer's pattern shape. The low modulus matrix material used in the practice of this invention is epoxy resin. Referring to FIGS. 5 and 6, there is shown the pattern of the concave shell and convex side respectively of the blade. The contours represent areas of constant thickness for a cross section of the blade for each surface. Essentially, the contours correspond to the pattern for a single layer of fiber material. For instance, line 500 represents the pattern for the innermost part of the blade, while line 502 represents the outer layer pattern of the blade. In constructing the blade, the unidirectional, side-by-side parallel fibers encased in a ductile low strength, low modulus matrix material are laid over a pattern and cut to the pattern with the direction of the fibers being aligned in a predetermined direction. In the practice of this invention, the fibers are aligned in an alternating pattern of +80, +35, −10, +35 degrees from the radial axis 322. The two halves or surfaces of the blades are built up by layering each layer on top of each other. Since the epoxy impregnated layers are very tacky, the layers adhere to each other. The blade shape is thus formed with two shells or halves, one for the convex surface and one for the concave surface.

Figure 7:
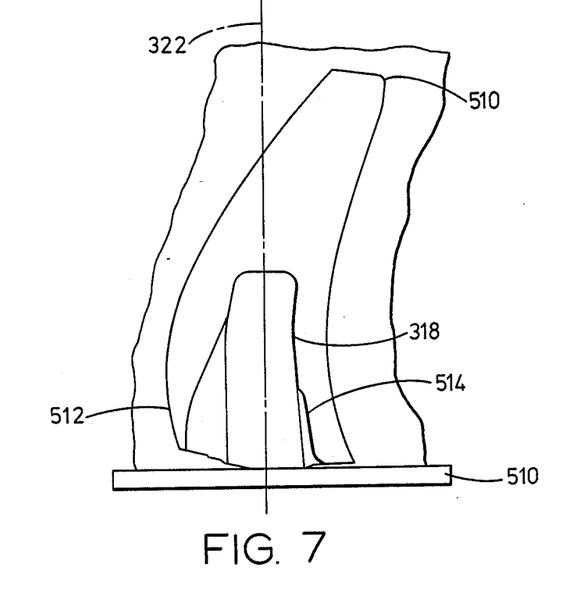
FIG. 7 illustrates the method of clamping the shells, blade spar, foam fillers, and adhesive in a mold to construct the blade.

Referring to FIG. 7, a first shell is introduced into a mold 510, the mold being preshaped to the shape of the shell. The blade spar 318 is aligned along the radial axis 322 by clamping the blade spar 318 into an aligning mechanism on the mold 318 well known to those of ordinary skill in the art. The leading edge cavity is formed by positioning a piece of foam 512 in the shape of the cavity adjacent the leading edge of the blade spar 318. The trailing edge cavity is formed by positioning a piece of foam 514 in the shape of the cavity adjacent the trailing edge of the blade spar 318. Additional adhesive is applied to each side of the spar 318 to securely fasten the blade spar to the first shell 502. The second shell 503 is positioned and aligned on the first shell, blade spar, and foam fillers and enclosed in the mold. The mold is heated to a predetermined temperature for a predetermined length of time depending upon the cure cycle for the epoxy resin used in the manufacture. The blade is removed from the mold and allowed to cool. Excess resin is trimmed from the blade edges and the root portions. The leading edge protector is attached by vacuum bagging which is well known to those of ordinary skill in the art. Fasteners are then inserted through the blade from one surface to the other to provide additional strength for preventing the blade elements from separating under load. There are, of course, a considerable number of desirable alternate methods of fabricating composite structures. Fabrication methods for producing a high volume of blades will be accomplished by automated techniques. However, as is evident, the automated techniques will closely follow the method as discussed previously.

After the blade is constructed, it is statically balanced about two moment axes. The rotating imbalance caused by unaligned centroids of the rotation blades is reduced to a minimum. For example, in FIG. 8 there are illustrated two blades rotating about a centerline 12. A rotating imbalance is caused if centroid 22 of blade 24 is not aligned radially and axially with centroid 25 of blade 26. For instance, if the radial distance 28 is greater than the radial distance 30, a radial imbalance appears. Also, if the blades are not aligned at the same axial position, an imbalance occurs. The axial position is defined as the position on the axis (centerline 12) in which a perpendicular line passing through the centroid intersects the axis. Any imbalance produces vibrations in the propeller system which causes loss of power, or in extreme cases, destruction of the propeller system. Thus, to reduce vibrations, the rotating imbalance $(MW_1 - MW_2)$ is minimized, wherein $MW_1$ is the mass and weight for the first blade, FIG. 8, and $MW_2$ is the mass and weight for the second blade.

Figures 8, 9:
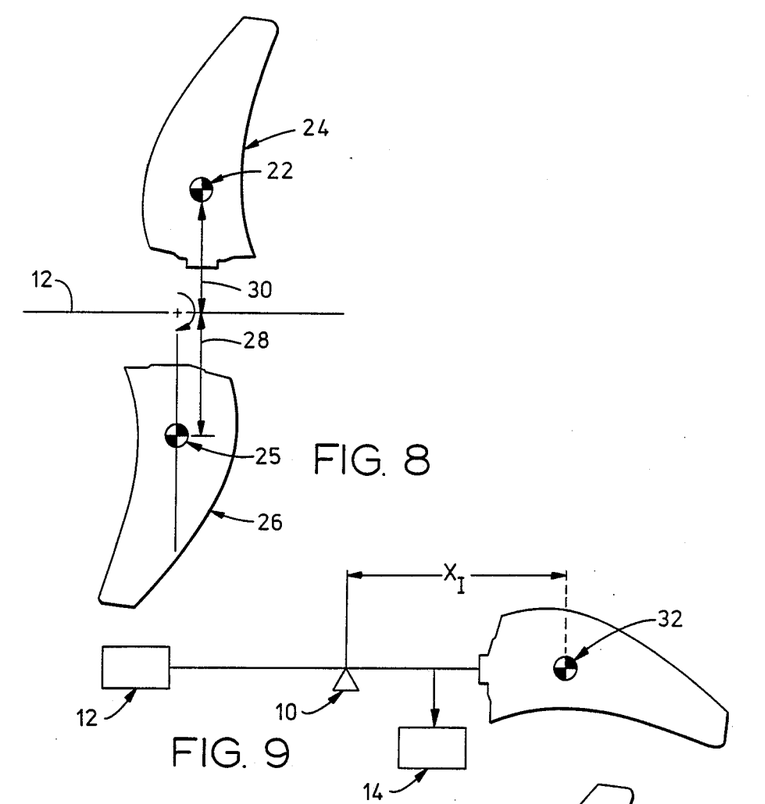
FIG. 8 illustrates blade imbalances which cause system vibrations.
FIG. 9 illustrates balancing the blade in a radial direction.

To eliminate these problems, the blade is balanced in a radial direction and an axial (chordwise) direction. The first axis is the radial axis and the second axis is the chord axis. Referring to FIG. 9, the blade is gripped by a weighing apparatus 10. The weighing apparatus can be a simple balancing weighing apparatus having a weight 12 which zeros out the apparatus and a scale 14 which measures the weight of the blade. The dead weight or pan weight of the blade is first determined in a manner well known in the art.

The moment weight for the radial axis is then determined. The radial moment weight equals $WX_I$, where W is the pan weight and $X_I$ is the distance from the fulcrum to the centroid 32. The moment weight is indicated by scale 14. Since the radial moment weight and pan weight is known, $X_I$ is determined. For a plurality of blades on a propeller $X_I$ is determined, where I represents the Ith blade. Next, the chordwise moment distance scatter for the blades of the propeller is determined.

Figure 10:
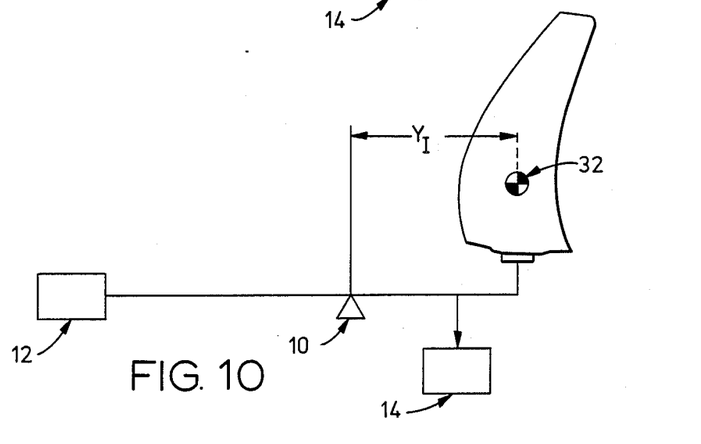
FIG. 10 illustrates chordwise balancing for a blade.

Referring to FIG. 10, the same weighing apparatus 10 determines the chordwise moment. The blade is rotated 90 degrees so that the axial position of the centroid 32 can be determined. The chordwise moment weight equals $WY_I$, where W is the pan weight and $Y_I$ is the axial position of the centroid for the Ith blade. The axial position $Y_I$ can be changed by the movement of the fore and aft balancing weight. For a plurality of blades, a predetermined $Y_I$ is chosen. Each blade is then modified so that the axial position of the centroid is the same for each blade. This is accomplished by carefully positioning, adding, or deleting fore and aft balancing weights to each blade to adjust $Y_I$. After the blades have been modified so that the axial position of the centroids are identical, the radial position of the centroids are then aligned. This is accomplished by adding or deleting weight to the root section, while maintaining the axial position of the centroid. For example, suppose two ounces are added to the root, one ounce is added to the fore balancing weight and one ounce is added to the aft balancing weight. In this manner, the radial position of the centroid is altered while maintaining the axial position of the centroid. Applicants have found that this twin axis static balancing serves to provide adequate dynamic balance for the blades when in rotation.

Thus, it has been shown a method of constructing a counterrotating aircraft propeller system having highly swept, wide chord, very thin blades. The blade is constructed from two shells comprised from a composite laminate material. The composite laminate includes a plurality of unidirectional fibers encased in a low modulus matrix. A blade spar is interposed between the shells. Adhesive is added between the spar and the shells to increase the bonding strength. Foam fillers are positioned at predetermined locations between the shells for foam filled cavities in the blade. The shells, blade spar, foam fillers, and adhesive are bonded together by curing in an autoclave under the appropriate cure cycle for the matrix. Fasteners, such as nut and bolt assemblies, are inserted through the blade for providing additional strength to hold the blade together under load. A leading edge sheath is attached to the leading edge for protecting the edge.

The above-described embodiment of the invention is illustrative only, and that modifications thereof may occur to those skilled in the art. Accordingly, this invention is not to be regarded as limited to the embodiment disclosed therein, but is to be limited as defined by the appended claims.

We claim:

1. A method of constructing a blade from a composite material having unidirectional high modulus fibers encased in a ductile low strength, low modulus matrix, the blade including a first and second surface intersecting in a tip end and a root section, a swept back leading edge and a swept back trailing edge, the blade further including a blade spar, said method comprising the steps of:
   (a) providing a pattern, the pattern representative of an area of constant thickness for the cross section of the blade for each surface;
   (b) shaping the composite material to the pattern to form a first and a second shell;
   (c) aligning the blade spar between the first and second shells;
   (d) positioning foam fillers at predetermined locations for foam filled cavities between the shells; and
   (e) bonding the blade spar, foam fillers, first shell and second shell together by heating the blade for an appropriate cure cycle for the low modulus matrix.

2. The method of claim 1, wherein step (e) of bonding further includes the step of applying an adhesive to the blade spar, foam fillers and inside surfaces of the first and second shells for maintaining the structural integrity of the blade.

3. The method of claim 1, further including the step of clamping the blade spar between the first and second shell for preventing the blade spar from twisting or separating the shells.

4. The method of claim 1, further including the steps of inserting a plurality of fasteners in the first shell through the blade spar and into the second shell for restraining the blade spar to the shells.

5. The method of claim 4, further including the step of inserting a plurality of fasteners through the first shell positional adjacent the trailing and leading edge of the blade spar for providing structural integrity between the spar and shells.

6. The method of claim 5, further including the steps of attaching a leading edge protector along the blade leading edge.

7. The method of claim 5, wherein the blade includes a first counterweight and a second counterweight adapted for movement in a radial and a chordwise direction for effecting the movement of the location of the centroid of the blade, said method further including the steps of:
   (f) positioning the centroid at a first predetermined location in the chordwise direction by adjusting the first and second counterweights; and
   (g) positioning the centroid at a second predetermined position in the radial direction by modifying the first and second counterweights.

8. The method of claim 7, further including the steps of:
   (h) measuring the locations of the centroids for a plurality of blades in a chordwise direction;
   (i) selecting a standard centroid location in a chordwise direction for minimizing the scattering of the centroids' locations; and
   (j) positioning the centroid for each blade to the standard centroid location.

9. The method of claim 8, further including the steps of:
   (k) measuring the locations of the centroids in a radial direction;
   (l) selecting a standard centroid location in a radial direction for minimizing the scattering of the radial centroid locations while maintaining the location of the centroids at the standard chordwise centroid location; and
   (m) positioning the centroid for each blade of the plurality of blades to the standard centroid location in the radial direction.

10. A method for maintaining the structural integrity of a blade from a composite material having unidirectional high modulus side-by-side parallel fibers encased in a ductile low strength, low modulus matrix, the blade being highly swept, wide chord and thin, said method comprising the steps of:
   (a) providing a first and a second shell of the blade, each shell representative of half of the blade and having a plurality of composite layers of material shaped to a respective profile of the blade and having the fibers in the respective layers aligned in varying directions;
   (b) applying an adhesive to an inside surface of at least one of the shells;
   (c) aligning a blade spar between the first and second shell;
   (d) clamping the shells to the blade spar for maintaining the structural integrity of the blade and inserting a plurality of fasteners through the first shell, blade spar and second shell to fasten the shells to the blade spar; and
   (e) bonding the blade spar, first shell, and second shell together by curing the low modulus matrix under a predetermined cure cycle for the matrix.

11. The method of claim 10, further including the step of inserting a plurality of fasteners through the first shell and second shell positionally adjacent the leading edge of the blade spar.

12. The method of claim 11, further including the step of inserting a plurality of fasteners through the first shell and second shell positionally adjacent the trailing edge of the blade spar.

13. The method of claim 10, further including the step of balancing the blade in a radial direction and a chordwise direction.

14. A method of constructing a blade from a plurality of composite layers, each layer having unidirectional side-by-side parallel high modulus fibers encased in a ductile low strength, low modulus matrix, the blade including a first and second shell comprised of the composite layers, intersecting in a tip end and a root section, a swept back leading edge and a swept back trailing edge, the blade further including a blade spar, said method comprising the steps of:
   (a) providing a pattern for each layer, the pattern representative of an area of constant thickness for the cross section of the blade for each layer of each shell;
   (b) shaping the composite layer to the pattern to form the first and a second shell, each shell representative of half the blade;
   (c) aligning the blade spar between the first and second shells;
   (d) positioning foam fillers at predetermined locations for foam filled cavities between the shells;
   (e) applying an adhesive to the blade spar, foam fillers and inside surfaces of the first and second shell for maintaining the structural integrity of the blade; and
   (f) bonding the blade spar, first shell and second shell together by heating the blade for an appropriate cure cycle for the low modulus matrix.

15. The method of claim 14, further including the steps of clamping the shells to the blade spar for maintaining the structural integrity of the blade.

16. The method of claim 15, wherein the step of clamping further includes inserting a plurality of fasteners through the first shell, blade spar and second shell to fasten the shells to the blade spar.

17. The method of claim 16, further including the step of inserting a plurality of fasteners through the first shell and second shell positionally adjacent the leading edge of the blade spar.

18. The method of claim 17, further including the step of inserting a plurality of fasteners through the first shell and second shell positionally adjacent the trailing edge of the blade spar.

19. The method of claim 15, further including the step of balancing the blade in a radial direction and a chordwise direction.

20. A method for balancing a blade formed from a composite material having unidirectional side-by-side parallel high modulus fibers encased in a ductile low strength, low modulus matrix, the blade including a first and second surface intersecting in a tip end and a root section, a swept back leading edge and a swept back trailing edge, the blade further including a blade spar having a first counterweight and a second counterweight adapted for movement in a radial and a chordwise direction for effecting the location of the centroid of the blade, said method comprising the steps of:
   (a) positioning the centroid at a first predetermined location in the chordwise direction by adjusting the first and second counterweights; and
   (b) positioning the centroid at a second predetermined position in the radial direction by modifying the first and second counterweights.

21. The method of claim 20, further including the steps of:
   (c) measuring the locations of the centroids for a plurality of blades in a chordwise direction;
   (d) selecting a standard centroid location in a chordwise direction for minimizing the scattering of the centroids' locations; and
   (e) positioning the centroid for each blade to the standard centroid location.

22. The method of claim 21, further including the steps of:
   (f) measuring the locations of the centroids in a radial direction;
   (g) selecting a standard centroid location in a radial direction for minimizing the scattering of the radial centroid locations while maintaining the location of the centroids at the standard chordwise centroid location; and
   (h) positioning the centroid for each blade of the plurality of blades to the standard centroid location in the radial direction.

* * * * *